United States Patent [19]
Yoshida

[11] Patent Number: 5,476,558
[45] Date of Patent: Dec. 19, 1995

[54] WASTE PAPER DESTRUCTION APPARATUS FOR FORMING PAPER BLOCKS OUT OF WASTE PAPER

[76] Inventor: Hirokazu Yoshida, 10-415, 13 Amijima-cho, Miyakojima-ku, Osaka-shi, Osaka-fu, Japan

[21] Appl. No.: 320,384

[22] Filed: Oct. 11, 1994

Related U.S. Application Data

[63] Continuation of Ser. No. 111,779, Aug. 25, 1993, abandoned, which is a continuation of Ser. No. 923,219, Jul. 31, 1992, abandoned.

[30] Foreign Application Priority Data

Aug. 1, 1991 [JP] Japan ................................ 3-282338

[51] Int. Cl.[6] .......................... B32B 31/12; B32B 31/20; B32B 35/00
[52] U.S. Cl. ........................ 156/60; 156/204; 156/325; 156/474; 156/547; 156/558; 156/563; 156/578; 53/527; 100/35; 100/74; 100/914; 428/903.3
[58] Field of Search .......................... 428/903.3; 156/94, 156/278, 325, 558, 559, 563, 578, 547; 100/35, 40, 72, 73, 74, 76, 78, 80, 914; 53/116, 117, 527

[56] References Cited

U.S. PATENT DOCUMENTS

| | | | |
|---|---|---|---|
| 3,770,549 | 11/1973 | Carbone | 156/197 X |
| 3,950,215 | 4/1976 | White | 156/558 |
| 4,060,363 | 11/1977 | Nelson | 100/914 X |
| 4,878,981 | 11/1989 | Mizutani | 156/578 X |

*Primary Examiner*—David A. Simmons
*Assistant Examiner*—M. Curtis Mayes
*Attorney, Agent, or Firm*—Koda and Androlia

[57] ABSTRACT

An apparatus for forming paper blocks installable in offices to form paper blocks out of office-use paper such as computer printer paper, etc. including a treatment chamber, paper feeder and an adhesive apply device. Used and waste paper is fed into the treatment chamber by the paper feeder while being coated with adhesives by the adhesive apply device, and inside the treatment chamber, the paper with the adhesives coated thereon are pressed by a pusher or by air against the bottom of the chamber, thus forming firm paper blocks solidified by the adhesives.

5 Claims, 6 Drawing Sheets

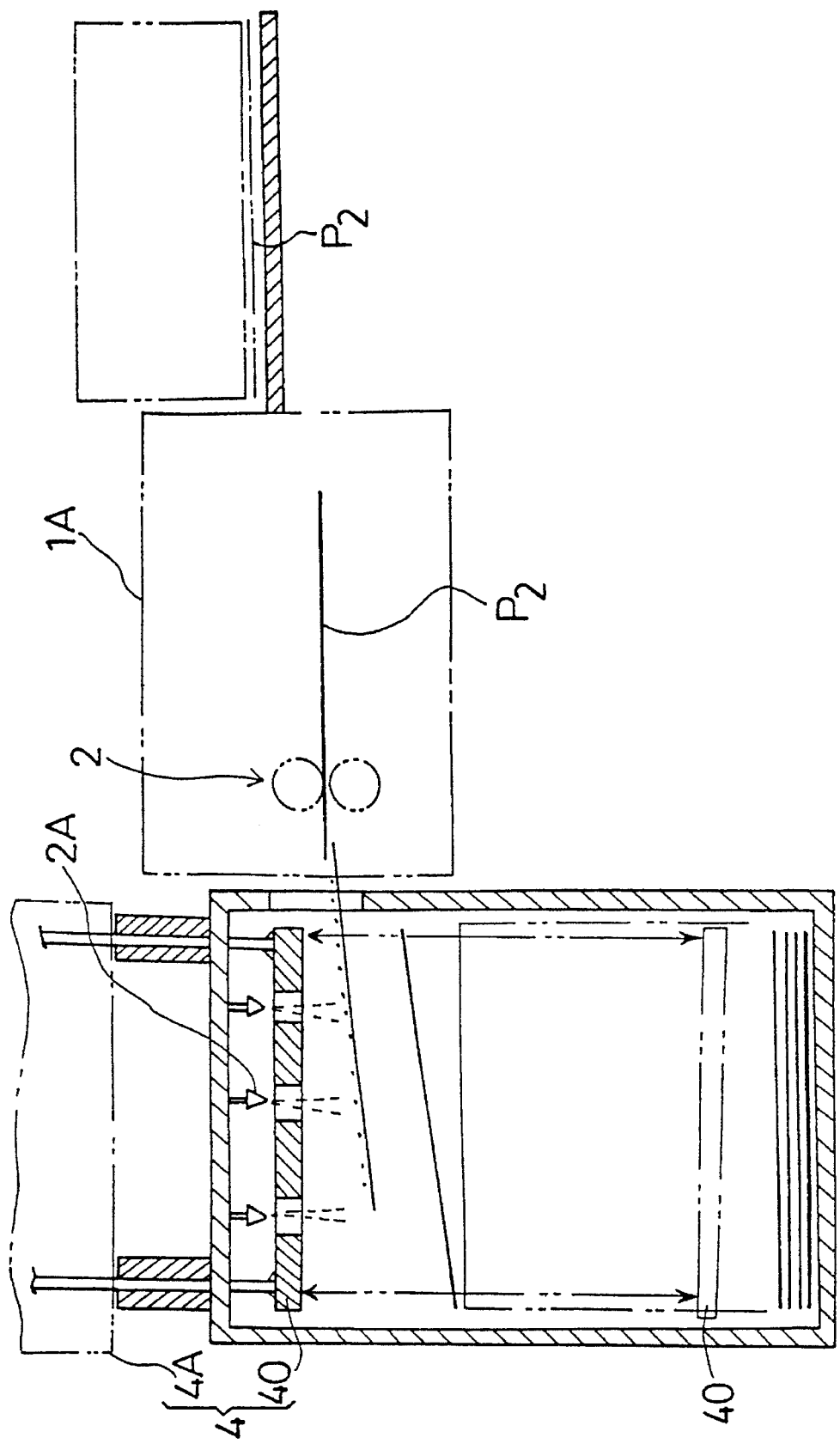

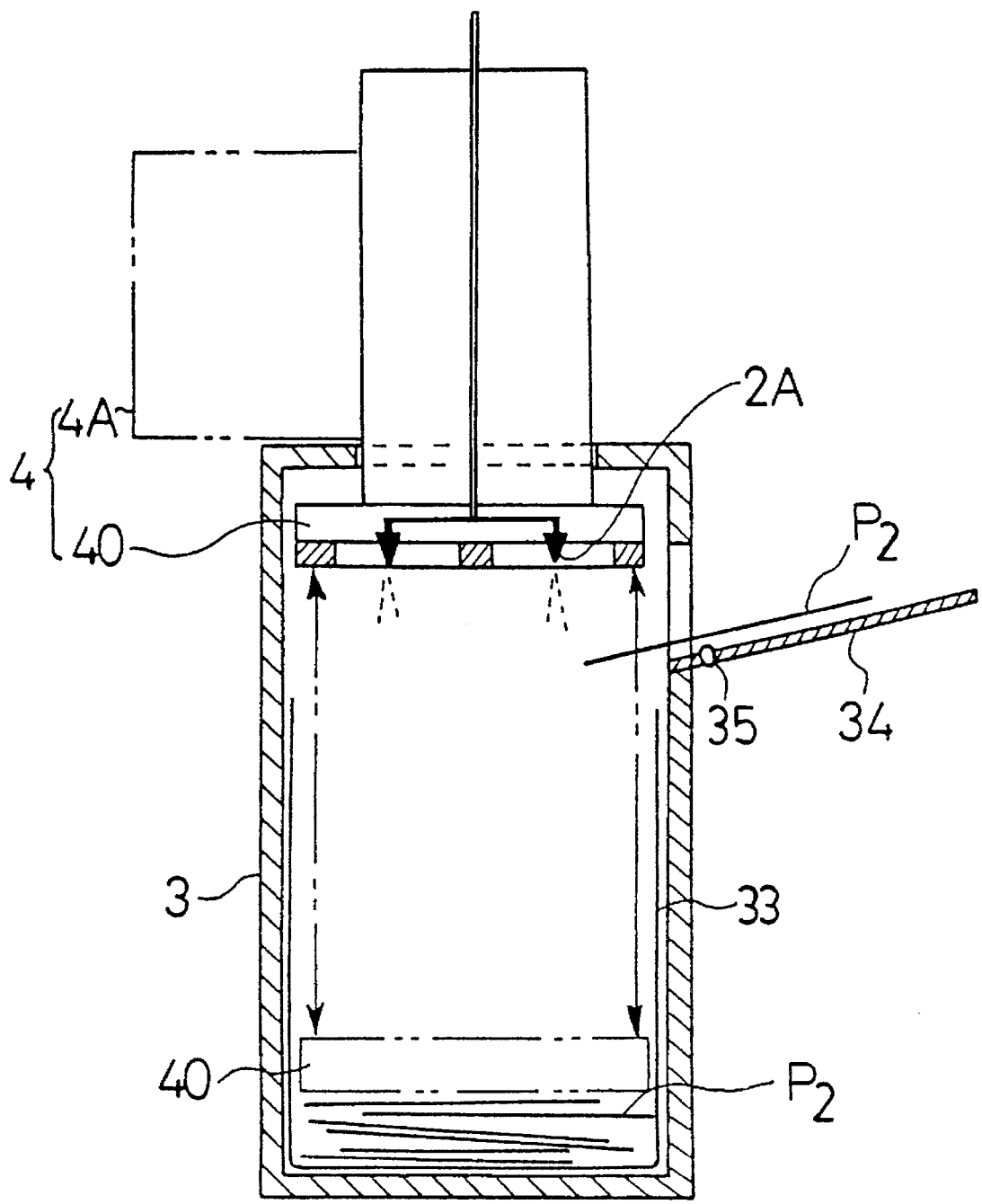

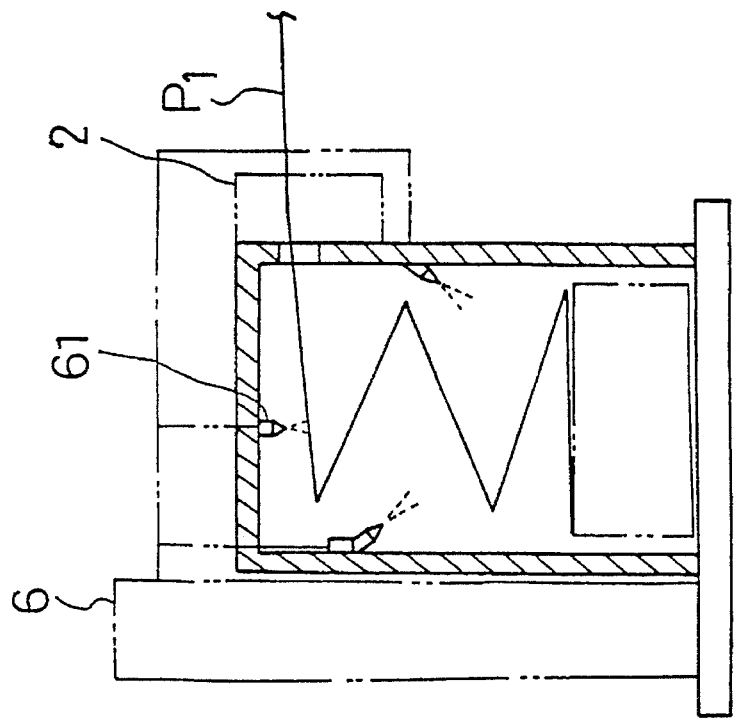
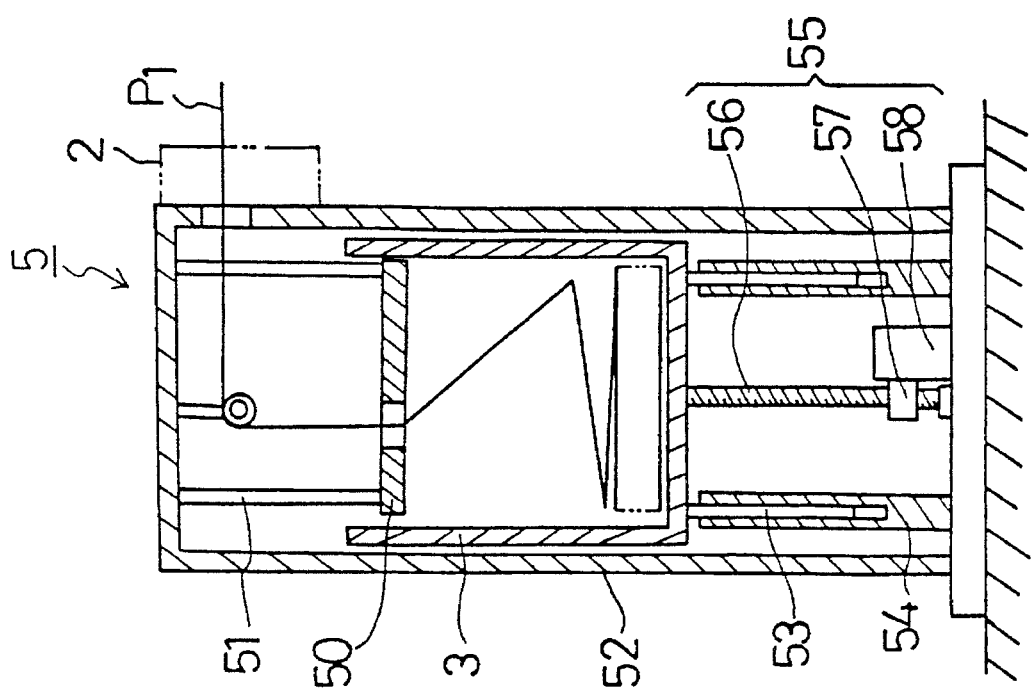

5,476,558

WASTE PAPER DESTRUCTION APPARATUS FOR FORMING PAPER BLOCKS OUT OF WASTE PAPER

This is a continuation of application Ser. No. 08/111,779, filed Aug. 25, 1993, now abandoned, which is a continuation of application Ser. No. 07/923,219 filed Jul. 31, 1992, now abandoned.

BACKGROUND OF THE INVENTION

1. Field of the Invention

The present invention relates to an apparatus for forming paper blocks from waste paper in offices such as computer printer paper, etc.

2. Prior Art

Presently, waste office-use paper such as computer printer paper, copy machine paper, facsimile paper, etc. are cut into pieces by shredders. When confidential information are printed on paper, shredders are a must to prevent the confidential information from leaking out or being reproduced.

However, when shredders are used, the volume of cut paper or shreds can become so large that a large storage space is required. Accordingly, the office floor space required for storing wasted shreds is also required to be large. Furthermore, since the waste paper is shredded into fine pieces, there are not many efficient ways to reuse those paper.

SUMMARY OF THE INVENTION

Accordingly, it is a first object of the present invention to provide an apparatus which forms waste office-use paper into blocks, the apparatus being a size installable in an office so that waste paper blocks are easily stored and easily transferred, thus assuring an effective reuse of the waste paper.

It is a second object of the present invention to provide an apparatus for forming paper blocks which interposes adhesive coating layers between the used paper so that the paper is bonded together and formed into firm paper blocks.

It is a third object of the present invention to provide an apparatus for forming paper blocks which interposes an adhesive agent, that contains components having the same nature as the printing ink used on the waste paper, between the layers of paper so that any attempt to retrieve the content printed on the paper which could be made by separating the adhesive agent only from the printing ink is prevented.

BRIEF DESCRIPTION OF THE DRAWINGS

FIG. 3 is a sectional view of another type of main section of the paper block forming apparatus according to the present invention;

FIGS. 4, 5, 6, 7, and 8 respectively show other types of main sections used in the apparatus of the present invention.

DETAILED DESCRIPTION OF THE INVENTION

Figure 1:
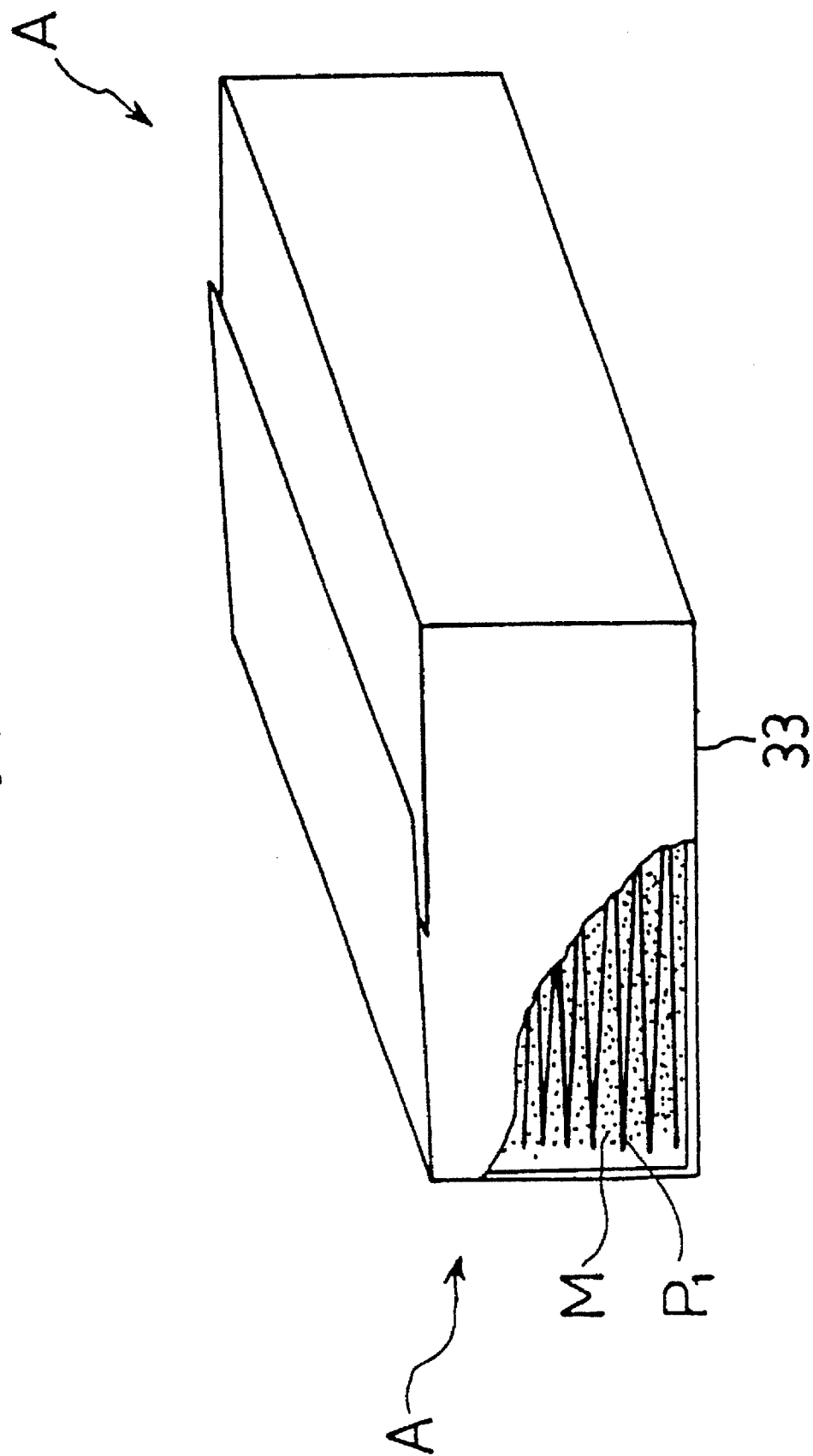
FIG. 1 is a perspective view of a paper block obtained by waste paper via the apparatus for forming paper blocks according to the present invention.

The first object of the present invention is accomplished by a recovery system of waste paper obtained by the paper block forming apparatus installed in offices, which produce a great amount of waste paper such as computer printer paper, etc., so as to form a paper block A as shown in FIG. 1 out of the waste paper. The paper blocks can be made by merely feeding the waste paper into the paper block forming apparatus, thus making it easy to store and transport the waste office-use paper in the form of paper blocks.

The paper block forming apparatus of the present invention will be described in detail based upon embodiments shown in the accompanying drawings.

Figure 2:
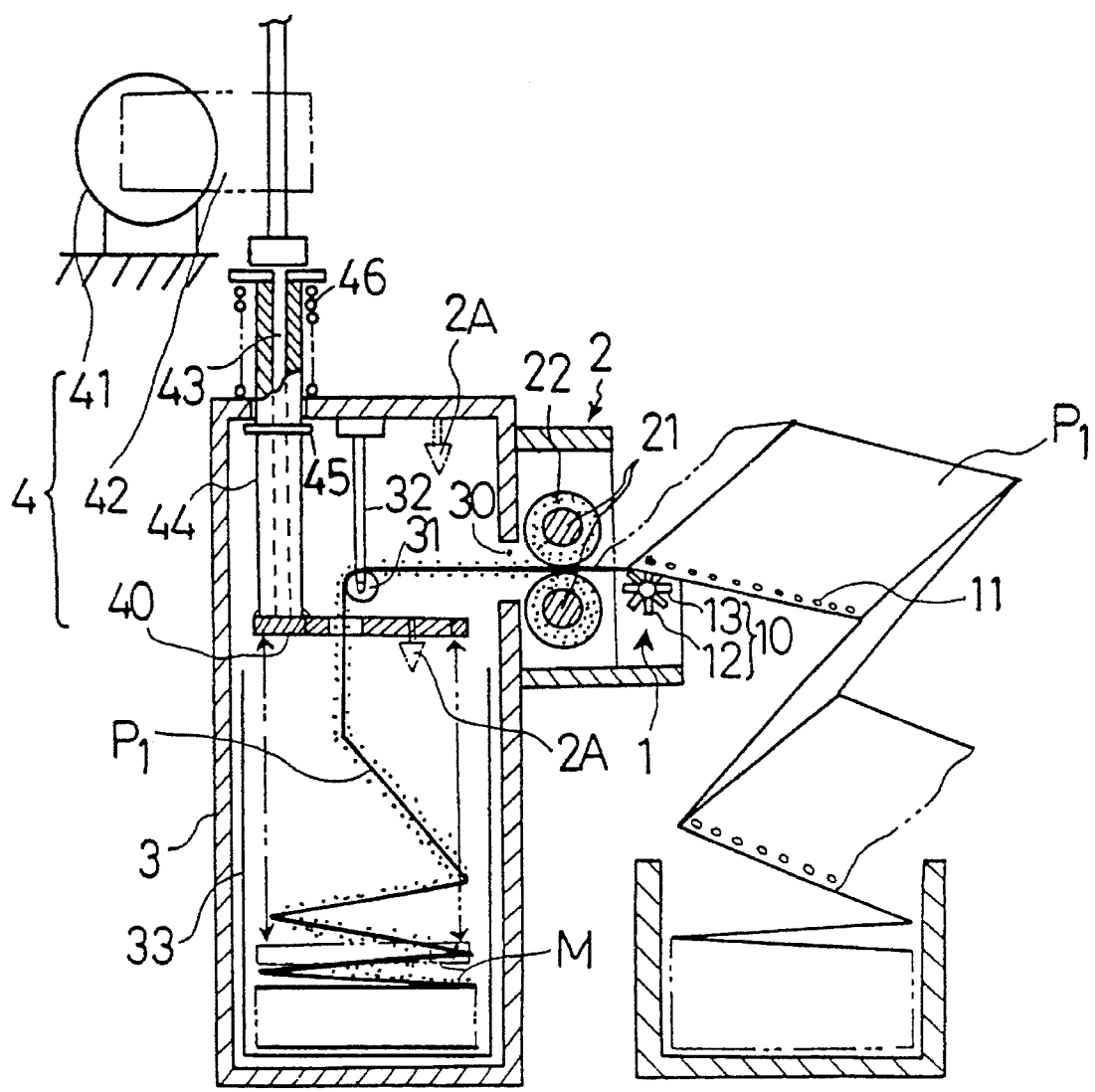
FIG. 2 is a sectional view of the main section of the apparatus for forming paper blocks according to the present invention.

FIG. 2 illustrates a paper block forming apparatus which forms paper blocks out of continuous, perforated computer printer paper P1.

A paper feeding device 1 is mounted on a treatment chamber 3. The paper feeding device 1 feeds a used printer paper P1 into the treatment chamber 3, utilizing the perforations 11 opened along the both sides of the printer paper P1. The feeding device 1 comprises pin wheels 10 which has projecting pins 13 mounted on a rotary shaft 12. The rotary shaft 12 is rotated by a shaft driving means (not shown).

An adhesive agent apply device 2 is installed on the treatment chamber 3. The adhesive agent apply device 2 applies an adhesive agent to the used printer paper P1 while the paper P1 is being fed out of the paper feeding device 1 and fed into the treatment chamber 3 or while the paper P1 is dropping into the treatment chamber 3.

The adhesive agent apply device 2 can be spray nozzles 2A installed in the upper part of the treatment chamber 3. In this embodiment, however, the adhesive agent apply device 2 is comprised mainly of a pair of sponge cylinders 22 mounted on two rotary shafts 21 which are in parallel with each other. The sponge cylinders 22 are impregnated with an adhesive agent.

It is desirable not to use adhesives used in offices that is made of a synthetic resin rubber for temporary bonding purposes and is applicable to the surfaces of the paper so that paper can be peeled off when necessary. Instead, the adhesive agent to be used in the present invention is preferably one which permeates the surfaces of the paper and opens up the fibers of adjacent coated surfaces so that the paper fibers are intertwined with each other to form an integral unit, thus making it impossible to peel the coated surfaces apart. If a two-liquid mixing type instant bonding agent is used, a first liquid agent can be impregnated into the sponge cylinders 22 and a second liquid agent can be sprayed out of adhesive agent spray nozzles 2A so that the paper P1 is coated with a two-liquid mixing type bonding agent.

It is also possible to form spiral projecting strips on the surfaces of the sponge cylinders 22 and wrap up the cylinders 22 with covers which have numerous holes. With this structure, partial coatings can be made on the surfaces of the paper P1, thus reducing and saving the adhesive agent. In addition, the sponge cylinders 22 can be designed so as to be movable in the axis directions while they are rotating so that the positions where adhesives are applied on the paper P1 can be shifted in the direction perpendicular to the direction the paper P1 is fed. With this adhesive coating method, the adhesive agent is applied on the paper P1 drawing curved tracks. Thus, the bonding effect can be increased and the protection of confidential data is secured. In addition, it is also possible to reduce the amount of adhesive agent to be used and thus reduce the paper recycling costs by forming projections on the surfaces of the sponge cylinders 22. With this uneven surface sponge cylinders 22, the adhesive agent is applied to the paper P1 randomly, lessening the amount of adhesive agent to be used.

In the above embodiment, two sponge cylinders 22 are set vertically so that one sponge cylinder is above the other. However, it goes without saying that only one sponge roller is used so that either the top cylinder or the bottom cylinder applies adhesives onto the surface of the paper P1.

As seen in FIG. 2, the treatment chamber 3 is a cubic box shape with an insertion opening 30 formed in the upper part of one of the side walls. A suspended bar 32 which has a guide roller 31 at its lower end hangs down from the top of the treatment chamber 3. The guide roller 31 folds and pushes down the paper P1 that is fed into the treatment chamber 3 via the paper feeding device 1. Thus, the paper P1 is stacked in layers or piled up inside the treatment chamber 3.

With a recovery bag 33 placed inside the treatment chamber 3, the adhesive agent is prevented from sticking to the inner surfaces of the treatment chamber 3.

Figure 7:
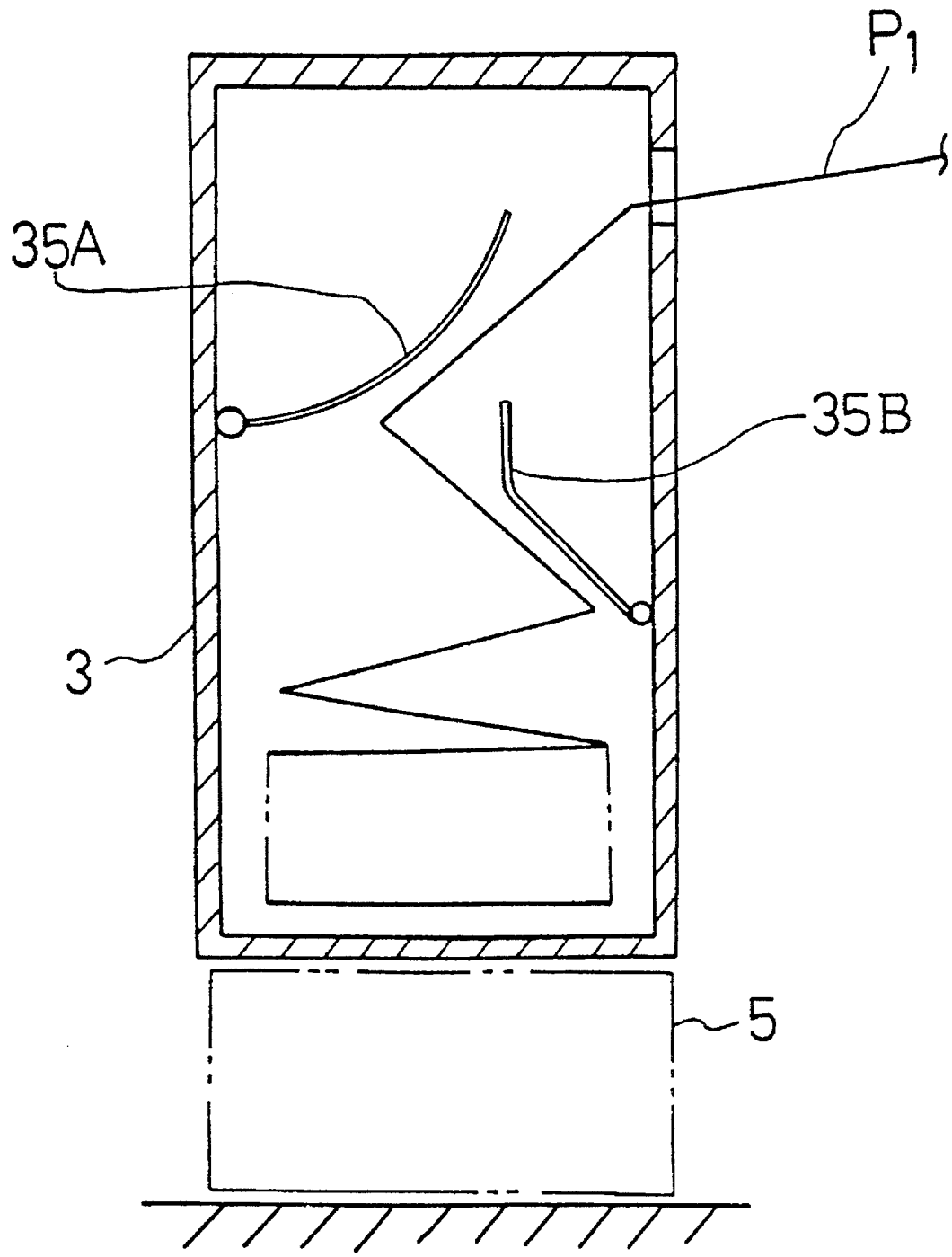

As shown in FIG. 7, paper guides 35A and 35B, instead of the use of the guide roller 31 and the suspended bar 32, can be used so that the paper P1 can drop naturally by its own weight and folded at its folding lines.

The reference numeral 4 in FIG. 2 designates a pressing device. The pressing device 4 is provided on the treatment chamber 3 so that it applies pressure from above to the paper P1 piled up in layers inside the treatment chamber 3. It is preferable to use a Teflon finishing or to provide other similar treatments on the surfaces of the pressing device 4, especially on a pressing board 40 described below) so that the adhesive agent does not stick to the pressing device 4.

The pressing device 4 includes a pressing board 40. The pressing board 40 can be moved up and down inside the treatment chamber 3 via a shaft 44 which passes through a cylinder 43. The pressing board 40 is driven downwardly by a pressing-driving device 4A consisting essentially of a transmission device 41, which has a one-way clutch, and a driving source (such as a motor) 42, so that the pressing board 40 is pressed against the paper P1 stacked in layers at the bottom of the treatment chamber 3. When the one-way clutch is not actuated (in other words, when the driving source 42 makes a reverse rotation or is in a halt), the pressing board 40 is returned to stay at a "waiting position," which is at an upper section inside the treatment chamber 3 as shown in FIG. 2, by a spring 36 and a stopper 45.

With the structure described above, when the paper P1 is fed into the chamber 3, it is piled in a folded layer form at the bottom of the treatment chamber 3, and as described above, by way of the adhesive agent apply device 2, adhesive agent layers M are formed between the paper layers. Accordingly, by moving the pressing board 40 in the vertical direction, the paper P1 with adhesives applied thereon and in a form of folded layers is bonded together via the adhesive agent layers M and formed into a paper block which is obtained out of waste paper.

Afterward, the continuous printer paper P1, which is now in a block form, is taken out of the treatment chamber 3 together with the recovery bag 33. By folding the upper part of the recovery bag 33 as shown in FIG. 1, the paper block A is ready to be stored, transferred and processed in whatever way desired.

FIG. 3 illustrates an embodiment in which a waste office-use paper P2 is a single piece of (and not a continuous) paper P2 such as a copy paper (with confidential information printed or copied thereon). In this embodiment, an adhesive agent apply device 2 comprising a pair of rollers is installed inside a single-paper feeding device 1A so that the paper P2 is coated with adhesive agent by the apply device 2.

The single-piece paper P2, however, can be applied with the adhesive agent in a different way. As shown in FIG. 3, a plurality of spray nozzles 2A for spraying the adhesive agent onto the paper P2 are installed in the upper part of the treatment chamber 3. With these nozzles 2A, the adhesive agent is applied onto the paper P2 while the paper P2 is dropping to the bottom of the treatment chamber 3. Either way (the roller type apply device 2 or the spray nozzles 2A), adhesive agent layers are formed between the layers of paper P2 so that a paper block is made when the pressing board 40 presses against the paper P2 at the bottom of the treatment chamber 3.

The object of the present invention can be accomplished by the use of a paper-feeder generally used, for example, in a copy machine as the single-paper feeding device 1A which continually feeds the paper P2 into the treatment chamber 3.

FIG. 4 illustrates another embodiment of the treatment chamber 3 which is of a trash box type.

In this embodiment, an adhesive agent is applied via spray nozzles 2A to the paper P2 which drop into the treatment chamber 3 via a paper tray 34. A sensor 35 provided on the paper tray 34 sends passing-paper signals to a control device (not shown) so that the control device actuates the adhesive agent apply device (not shown) and a pressing-driving device 4A. Each time a single piece of paper P2 is fed into the treatment chamber 3 via the paper tray 34, the sensor 35 senses the passing paper P2, sends a signal to the control device so that the adhesive agent is applied onto the paper P2 by the spray nozzles 2A, and the pressing-driving device 4A is actuated so that the pressing board 40 is lowered. These spraying and lowering motions are made intermittently as one sheet of paper P2 is fed into the chamber 3.

Instead of the pressing device 4 used in the embodiments shown in FIGS. 2, 3 and 4, a lifting device 5 as shown in FIG. 5 can be used.

The lifting device 5 includes a receiving plate 50 (which corresponds to the pressing board 40) which is mounted to outer frame 52 via supporting columns 51. The lifting device 5 further includes guide shafts 53 which extend downwardly from the bottom of the treatment chamber 3. The guide shafts 53 are inserted into guide tubes 54, which are integral parts of the outer frame 52, so that the treatment chamber 3 is free to move up and down guided by the guide tubes 54. In addition, a lifting-driving device 55 is installed in the lifting device 5. The lifting-driving device 55 includes a driving screw shaft 56 which extends downwardly from the bottom of the treatment chamber 3, a transmission mechanism 57 and a motor 58. Thus, the lifting-driving device 55 moves the treatment chamber 3 up and down. When the treatment chamber 3 is raised, the waste paper P1 piled at the bottom of the chamber 3 is pressed by the receiving plate 50 and bonded to each other so that they are formed into a single, integral unit of paper block.

FIG. 6 illustrates still another embodiment of the present invention. In this embodiment, the both pressing device 4 and lifting device 5 are omitted, and instead compressed air is used. The compressed air from an air supply 6 is blown out of air nozzles 61 in the treatment chamber 3. Thus, paper P1 is compressed from above by the compressed air flowing down from the air nozzles 61. As in the same manner as described above, the paper P1 is folded and bonded together, forming a paper block.

An adhesive agent different from those used in the embodiments illustrated in FIGS. 2, 3 and 4 can be used in the present invention. More specifically, an adhesive agent which contains the same components as the chemicals or the printing agent (ink, solvents, copy machine toners, printer ribbon carbon, etc.) used on the paper can be utilized. With the use of the adhesive agent of the same characteristics as of the printing agent, if an attempt is made to reproduce confidential information printed on the waste paper by removing only the adhesive agent, the ink, etc. (the printing agent) is also removed together with the adhesive agent since the same material is used in the ink, etc. and in the adhesive agent. Thus, protection of confidential information is secured.

As seen from the above, according to the present invention a special processing mechanism such as shredding machines are no longer necessary. Since the paper block forming apparatus of the present invention includes the adhesive agent apply device as its main element, the apparatus as a whole can be simple in structure and manufactured at low cost. The apparatus of the present invention can be installed at desk side, does not demand a large installation area, nor does not require a special used-paper disposal room.

Moreover, since the waste paper that is treated by the apparatus of the present invention is formed into integral firm blocks by way of adhesive agent that bonds the paper together, matters printed on the paper cannot be reproduced. Accordingly, confidential information which had been printed or copied on the paper can be fully protected.

In addition, since the paper is formed into blocks, storage and transportation can be easy. Thus, the used paper is reused more effectively. In particular, when used paper is converted into "reclaimed paper," high-quality reclaimed paper is obtained by selecting only the high-quality office-use paper when forming the paper blocks.

In cases where the waste paper is burned for disposing purposes, since the paper blocks have a smaller air contact surface than shredded pieces of paper, the incineration temperature can be lower than that of burning of the shreds, which results in less damage to the incinerator. In addition, the low temperature incineration can contribute as good heating resources for burning the trash.

Moreover, the paper blocks can be processed into paper clay, etc. which can be utilized as construction and interior decoration materials such as tiles, bricks, etc.

Furthermore, according to the present invention, it is impossible to separate the adhesive agent alone from the paper blocks which are obtained by bonding the waste paper with the adhesive agent which has substantially the same chemical characteristics as the printing agent used for the paper. Accordingly, reproduction of the printing of confidential contents which had been made on the waste paper is prevented, and confidential information on the waste paper is more reliably protected.

I claim:

1. A method for forming paper blocks in an apparatus comprising a treatment chamber, a recovery bag removably provided in the treatment chamber and an adhesive agent applying device provided in said treatment chamber, said method comprising the steps of:

feeding printed paper into said treatment chamber;

applying an adhesive agent to an entire surface of said printed paper;

accommodating said printed paper with said adhesive agent applied thereto in said recovery bag; and pressing said printed paper together in said recovery bag to bond said printed paper together to form an integral paper block;

whereby a confidentiality of printed matter on said printed paper is protected.

2. An apparatus for forming paper blocks characterized in that said apparatus comprises a treatment chamber, a recovery bag removably provided in said treatment chamber which accommodates computer printed paper fed thereinto and an adhesive agent applying device provided in said treatment chamber for applying to an entire surface of said computer printed paper an adhesive agent that contains components which are substantially the same as those of a printing agent used on said computer printed paper, and in that said computer printed paper is bonded to each other via adhesive agent layer so that said paper layers are formed into an integral paper block and so that a separation of said adhesive agent layers from said paper block is made impossible.

3. An apparatus for forming paper blocks comprising:

a treatment chamber;

a paper recovery bag removably provided in said treatment chamber;

a paper feeding means provided on said treatment chamber for feeding computer printed paper into said paper recovery bag;

an adhesive applying means provided on said treatment chamber, said adhesive applying means for applying to an entire surface of said computer printed paper being fed into said paper recovery bag an adhesive agent containing components which are substantially the same as those of a printing agent used on said computer printed paper; and a pressing means comprising a pressing board movably provided inside said treatment chamber to press said computer printed paper against an inner wall of said paper recovery bag and a pressing board driving means provided outside said treatment chamber to move said pressing board.

4. An apparatus for forming paper blocks from a plurality of single-piece paper characterized in that said apparatus comprising:

a treatment chamber of a cubic box shape with a square cross section, said treatment chamber being provided with an insertion opening at an upper portion thereof and capable of storing said paper in a piled up fashion;

a recovery bag installed in said treatment chamber such that said recovery bag is located adjacent to inner surfaces of said treatment chamber, said recovery bag having an opening at a top thereof and an upper end of said recovery bag being positioned under said insertion opening of said treatment chamber;

a pressing board which moves up and down inside said treatment chamber, said pressing board being positioned higher than said single-piece paper entered into said recovery bag when said pressing board reaches an upper end of an upward stroke; and spray nozzles provided at a top portion of said treatment chamber for applying an adhesive agent to an entire surface of said paper, said adhesive agent containing components which are substantially the same characteristics as printing agent used on said paper.

5. An apparatus according to claim 4, further comprising a single-piece paper feeding device at said insertion opening of said treatment chamber.

* * * * *